United States Patent [19]
Roth

[11] Patent Number: 6,003,488
[45] Date of Patent: Dec. 21, 1999

[54] DIRECT INJECTION SPARK IGNITION ENGINE

[75] Inventor: David B. Roth, Bloomfield, Mich.

[73] Assignee: Chrysler Corporation, Auburn Hills, Mich.

[21] Appl. No.: 09/115,935

[22] Filed: Jul. 15, 1998

[51] Int. Cl.⁶ .................................................. F02B 3/00
[52] U.S. Cl. .......................................... 123/298; 123/301
[58] Field of Search .................................. 123/298, 301, 123/305

[56] References Cited

U.S. PATENT DOCUMENTS

| | | | |
|---|---|---|---|
| 2,058,487 | 10/1936 | Mock | 123/32 |
| 2,164,234 | 6/1939 | Erren | 123/69 |
| 2,231,392 | 2/1941 | McCarthy | 123/50 |
| 2,779,320 | 1/1957 | Goschel et al. | 123/32 |
| 2,958,313 | 11/1960 | Kincaid | 123/301 |
| 3,154,059 | 10/1964 | Witzky et al. | 123/32 |
| 3,919,982 | 11/1975 | Goto et al. | 123/32 E |
| 4,318,377 | 3/1982 | Occella et al. | 123/279 |
| 4,688,532 | 8/1987 | Hasegawa | 123/302 |
| 5,421,301 | 6/1995 | Feuling | 123/298 |
| 5,540,200 | 7/1996 | Naitoh et al. | 123/299 |
| 5,605,125 | 2/1997 | Yaoita | 123/275 |
| 5,613,471 | 3/1997 | Yaoita | 123/298 |
| 5,628,290 | 5/1997 | Iida et al. | 123/305 |

FOREIGN PATENT DOCUMENTS 3128543  2/1983  Germany .

Primary Examiner—John Kwon
Attorney, Agent, or Firm—Kenneth H. Maclean

[57] ABSTRACT

An internal combustion engine has a piston reciprocable in a cylinder toward and away from a combustion chamber. An intake valve admits air into the combustion chamber. An exhaust valve discharges products of combustion from the combustion chamber. A fuel injector is positioned to direct a plume of fuel into the combustion chamber along a path and in a direction to impinge upon the exhaust valve. The piston has an end face formed with a concave recess or pocket adjacent the exhaust valve. The exhaust valve is constructed and arranged to deflect fuel impinging thereon into the recess. The recess being shaped to redirect fuel back toward the path of the plume of fuel.

6 Claims, 2 Drawing Sheets

DIRECT INJECTION SPARK IGNITION ENGINE

This invention relates generally to internal combustion engines and more particularly to an exhaust-valve-targeted combustion chamber design for a direct injection spark ignition engine.

BACKGROUND AND SUMMARY OF THE INVENTION

Typical direct injection engines either have a centrally mounted fuel injector aimed at the piston crown or a side mounted injector aimed at the cylinder bore wall. These designs have the problem of significant piston crown fuel wetting or cylinder wall fuel wetting.

In accordance with the present invention, a side mounted fuel injector is aimed at the exhaust valve. All of the fuel that is not vaporized before reaching the exhaust valve, which may be on the order of about 10%, will be instantly vaporized when the droplets impinge on the exhaust valve. This eliminates fuel wetted surfaces and the resulting diffusion flame combustion.

In the case of late injection and lean stratified charge, this should result in low hydrocarbon emissions and more favorable burn rates than direct injection spark ignition engines with wall wetting. In the case of early injection and homogeneous charge, the relationship between the fuel injector and the air inlet stream promotes very good air/fuel mixing. In addition, the fuel cooling of the exhaust valve may yield an improvement in knock resistance.

In accordance with the embodiment of the invention about to be described, the fuel injector is positioned to direct a plume of fuel into the combustion chamber along a path and in a direction to impinge upon the exhaust valve. The piston has an end face formed with a concave recess or pocket. The exhaust valve is constructed and arranged to deflect fuel impinging thereon into the recess. The recess is shaped to redirect fuel back toward the path of the plume of fuel.

More specifically, the plume of fuel from the injector has a marginal portion intersecting the spark plug gap. The fuel that is redirected back towards the path of the plume of fuel from the injector is directed toward the spark plug gap.

In accordance with the present construction, the widest part of the injection plume intersects the spark plug gap. This provides an opportunity for ignition very shortly after injection. Also, the liquid fuel that reaches the hot exhaust valve surface vaporizes on contact with this surface at a point which is a very short distance from the spark plug gap and provides another opportunity for ignition. Liquid fuel and vapor which bounces, spatters, or is simply deflected from the surface of the exhaust valve and is guided by the recess or pocket in the piston top back towards the spark plug gap provides yet another opportunity for ignition. If ignition is accomplished before this redirected fuel reaches the spark plug gap, it will intersect the expanding flame front and be quickly burned.

One object of this invention is to provide an exhaust-valve-targeted combustion chamber design for a direct injection spark ignition engine having the foregoing features and capabilities.

Another object is to provide an exhaust-valve-targeted combustion chamber design which is of relatively simple construction yet highly effective in the performance of its intended function.

Other objects features and advantages of the invention will become more apparent as the following description proceeds, especially when considered with the accompanying drawings.

DETAILED DESCRIPTION OF THE PREFERRED EMBODIMENT

Figure 1:
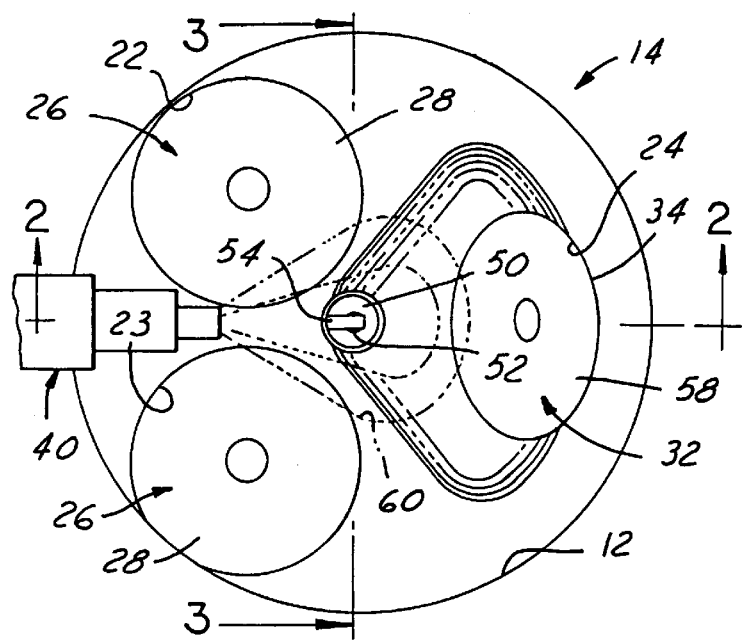
FIG. 1 is a semi-diagrammatic view of an exhaust-valve-targeted combustion chamber design for a direct injection spark ignition engine showing the intake and exhaust valves, a spark plug and a fuel injector for directing fuel into a combustion chamber. This view may be considered as looking upward from the top of the cylinder toward the cylinder head, with the recess in the piston added to show its position relative to the exhaust valve and spark plug.

Referring now more particularly to the drawings, there is shown a piston 10 which is longitudinally reciprocable in a cylinder 12 of an internal combustion engine 14. A cylinder head 16 closes the end of the cylinder 12 and has a generally concave crown surface 18 which cooperates with the cylinder and the piston in defining a combustion chamber 20.

Figure 2:
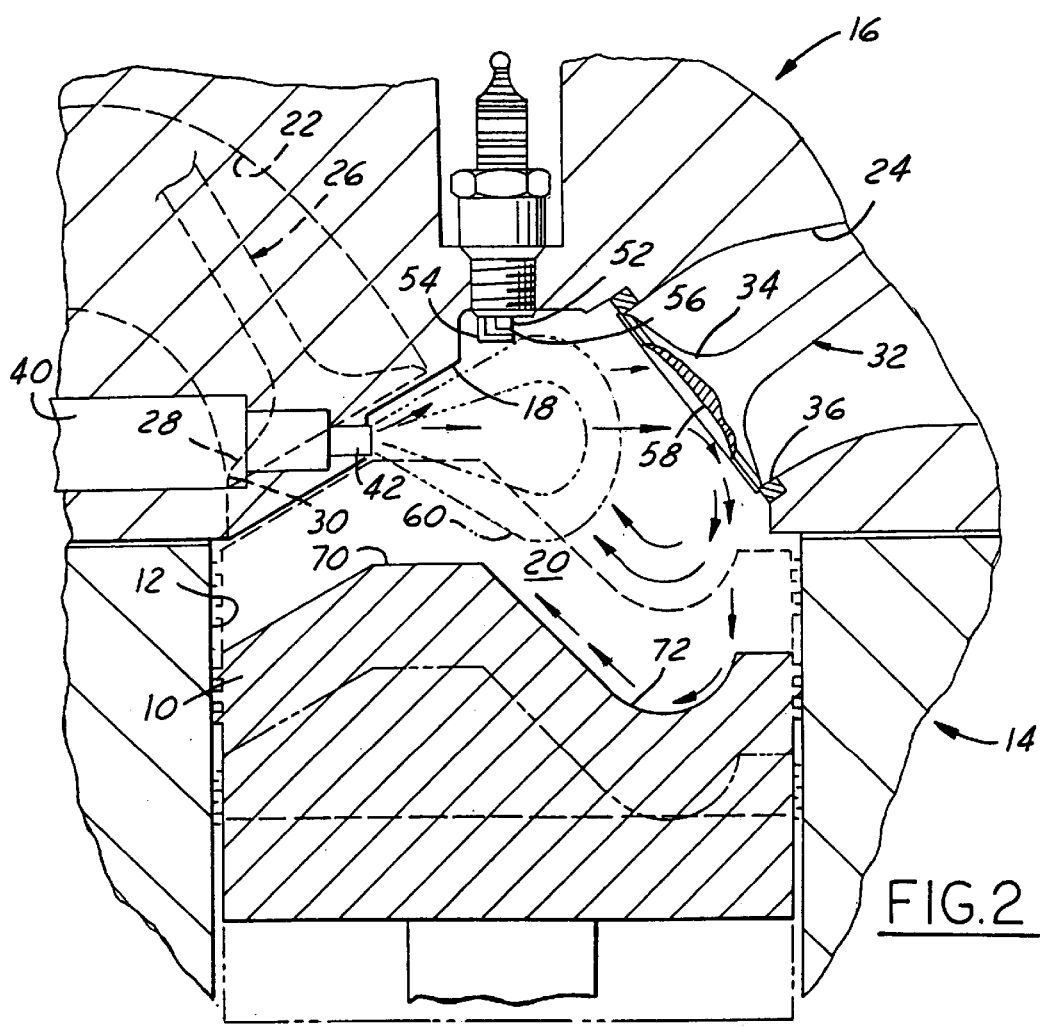
FIG. 2 is a sectional view taken on the line 2—2 in FIG. 1. The piston is shown in an intermediate position in solid lines, and in advanced and retracted positions in broken lines.
Figure 3:
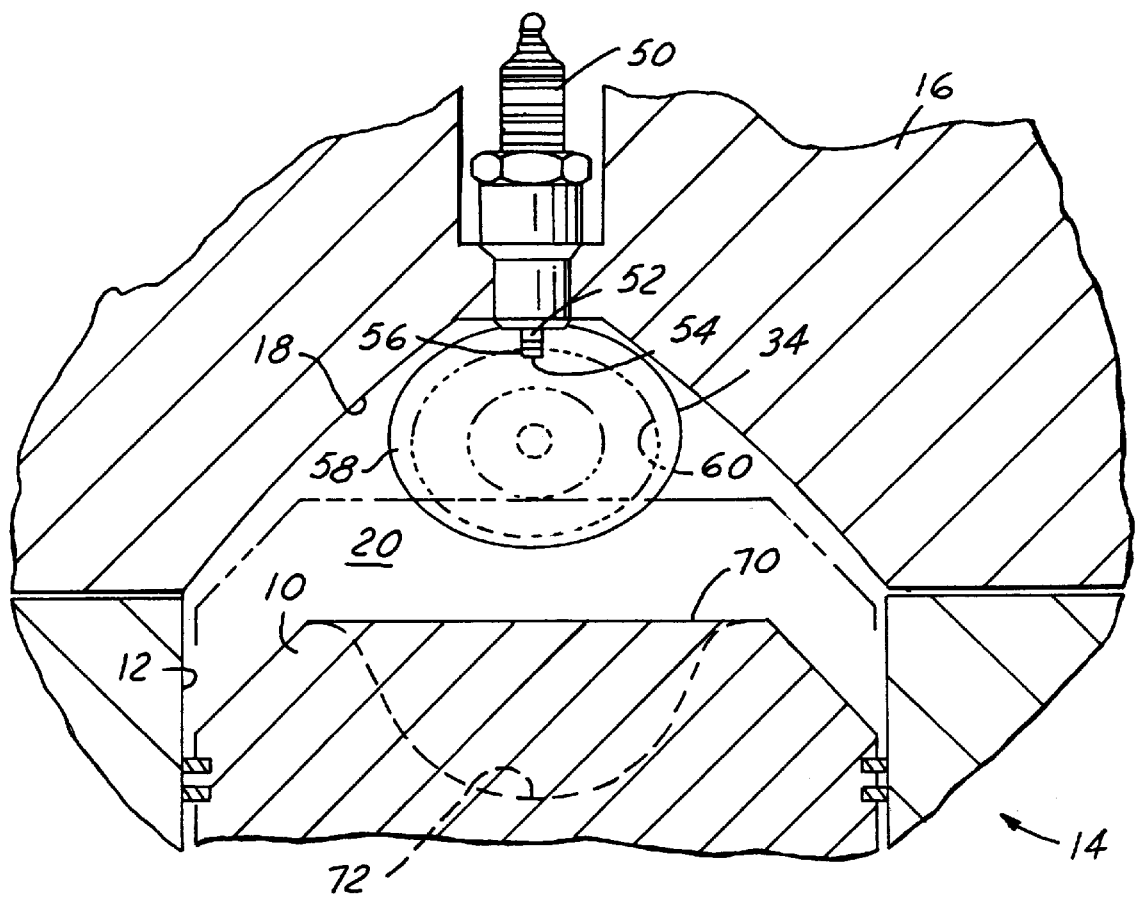
FIG. 3 is a sectional view taken on the line 3—3 in FIG. 1.

Laterally spaced air intake passages 22 and 23 in the cylinder head 16 open into the combustion chamber at one side thereof. An exhaust passage 24 in the cylinder head opens into the combustion chamber at the opposite thereof. An intake valve 26 for each intake passage 22, 23 has a head 28 which opens and closes a port 30 in the cylinder head to control the flow of air into the combustion chamber. An exhaust valve 32 has a head 34 which opens and closes a port 36 in the cylinder head to control the discharge of products of combustion from the combustion chamber. The valves 26 and 32 are shown in FIG. 2 in their closed positions.

A fuel injector 40 has a nozzle 42 opening into the combustion chamber between the air intake passages 22 and 23, with the nozzle pointing toward the head 34 and the exhaust valve 32.

A spark plug 50 is mounted in the cylinder head between the fuel injector 40 and the exhaust valve 32. The spark plug has electrodes 52 and 54 in the combustion chamber defining a gap 56. The spark plug is centrally located with respect to the cylinder, as shown, with the gap 56 closely adjacent to the exhaust valve 32.

The head 34 of the exhaust valve 32 is shown as a flat, circular, disc-like member which may have a planar surface 58 fronting on the combustion chamber or the surface 58 may be slightly concave if desired.

The nozzle 42 of the fuel injector points at the center of the surface 58 of the exhaust valve head 34 and is adapted to emit a spray or plume of liquid fuel along a path and in a direction to impinge upon the surface 58. The expanding plume of fuel injected into the combustion chamber by the nozzle has its widest part indicated by the reference numeral 60. This widest part of the plume of fuel will be seen to substantially intersect or cross the spark plug gap.

The end face 70 of the piston 10 which defines a portion of the combustion chamber has the configuration shown in the drawings, which includes a concave recess or pocket 72 adjacent to the exhaust valve 32. The surface 58 of the head of the exhaust valve is shaped and angled to deflect fuel into the pocket 72 which is curved to redirect the fuel back toward the plume emitted by the nozzle 42 on a line leading to the spark plug gap 56.

Fuel emitted into the combustion chamber 20 by the nozzle 42 of the fuel injector is, as already stated, targeted on the surface 58 of the head 34 of the exhaust valve 32. The exhaust valve 32 is closed at this time. The widest part 60 of the plume of fuel intersects the spark plug gap 56 to provide an opportunity for ignition almost immediately after injection. When the fuel reaches the surface 58 of the head of the hot exhaust valve, it vaporizes on contact. This occurs very close to the spark plug gap to provide a second opportunity for injection. The fuel which does not then ignite is deflected from the surface 58 into the pocket 72 in the end face 70 of the piston. The pocket is concave and curved to redirect the fuel back toward the emitted plume on a line leading to the spark plug gap 56, providing a third opportunity for ignition. Ignition may already have occurred, however, in which case the redirected fuel will be met by the ignited fuel and itself be burned.

What is claimed:

1. In an internal combustion engine, a cylinder having a combustion chamber, a piston reciprocable in said cylinder toward and away from said combustion chamber, a spark plug extending into said combustion chamber, an intake valve for admitting air into the combustion chamber, an exhaust valve for discharging products of combustion from said combustion chamber, and a fuel injector spaced from said exhaust valve and positioned to direct a plume of fuel into said combustion chamber along a path and in a direction to impinge upon said exhaust valve, said piston having an end face extending across said combustion chamber formed with a recess, said exhaust valve being constructed and arranged to deflect fuel impinging thereon into said recess, and said recess being shaped to redirect fuel back toward the path of said plume of fuel.

2. In an internal combustion engine as in claim 1, wherein said spark plug is positioned between said fuel injector and said exhaust valve.

3. In an internal combustion engine as in claim 1, wherein said recess is adjacent to said exhaust valve.

4. In an internal combustion engine as in claim 1, wherein said spark plug has electrodes defining a spark plug gap, and said plume of fuel has a marginal portion which intersects said spark plug gap.

5. In an internal combustion engine as in claim 1, wherein the redirection of fuel by said recess back toward the path of the plume of fuel is in the general direction of said spark plug.

6. In an internal combustion engine, a cylinder having a combustion chamber, a piston reciprocable in said cylinder toward and away from said combustion chamber, an intake valve for admitting air into the combustion chamber, an exhaust valve for discharging products of combustion from said combustion chamber, a fuel injector spaced from said exhaust valve and positioned to direct a plume of fuel into said combustion chamber along a path and in a direction to impinge upon said exhaust valve, and a spark plug extending into said combustion chamber between said exhaust valve and said fuel injector, said spark plug having electrodes defining a spark plug gap, said plume of fuel having a marginal portion intersecting said spark plug gap, said piston having an end face extending across said combustion chamber formed with a concave recess adjacent said exhaust valve, said exhaust valve being constructed and arranged to deflect fuel impinging thereon into said recess, and said recess being shaped to redirect fuel back toward the path of said plume of fuel in the general direction of said spark plug gap.

* * * * *